Aug. 5, 1969 R. H. GOLDBERGER 3,459,409
MIXING AND CONVEYOR SYSTEM
Filed Feb. 16, 1967 2 Sheets-Sheet 1
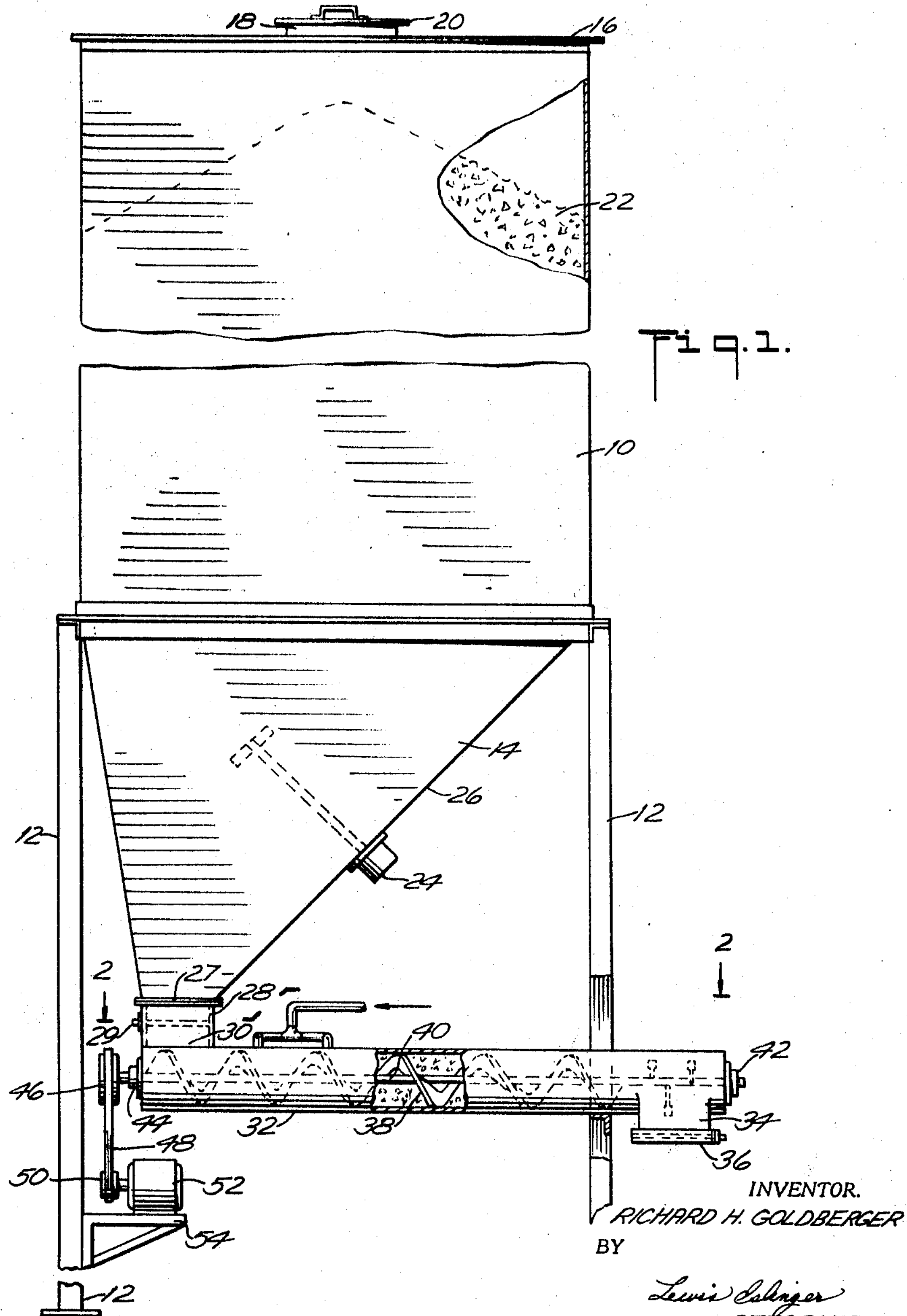

Aug. 5, 1969 R. H. GOLDBERGER 3,459,409
MIXING AND CONVEYOR SYSTEM
Filed Feb. 16, 1967 2 Sheets-Sheet 2
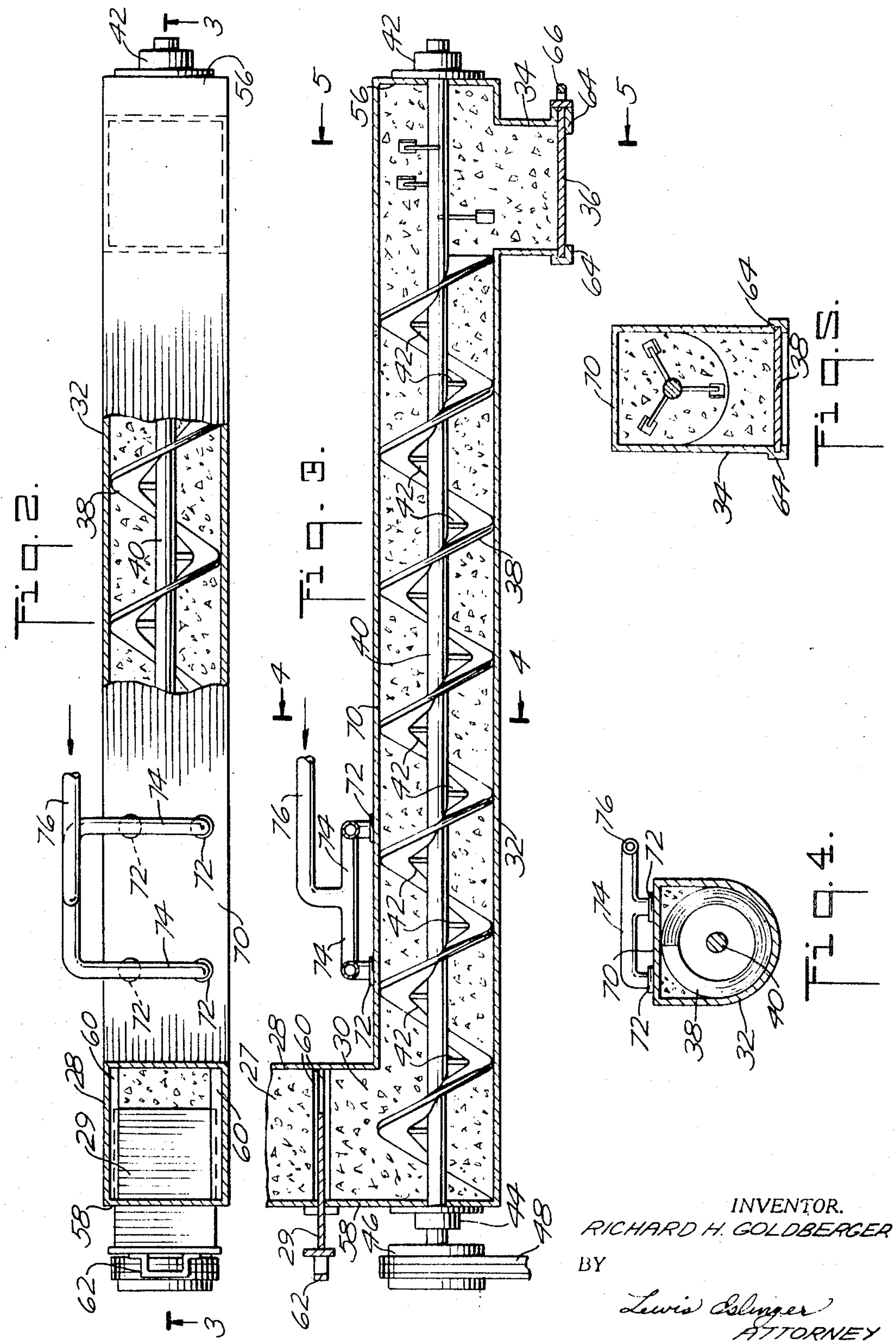
INVENTOR.
RICHARD H. GOLDBERGER
BY
Lewis Eslinger
ATTORNEY

United States Patent Office 3,459,409
Patented Aug. 5, 1969

3,459,409

MIXING AND CONVEYOR SYSTEM

Richard H. Goldberger, 331-4 Academy Terrace, Linden, N.J. 07036

Filed Feb. 16, 1967, Ser. No. 619,886
Int. Cl. B28c *7/14, 5/10;* B65g *33/00*
U.S. Cl. 259—168 2 Claims

ABSTRACT OF THE DISCLOSURE

A dry mix conveyor comprising a tubular conduit within which a helically shaped auger turns. The auger is cut away however along its longitudinal axis. Water may be added as mixing and conveying occur simultaneously.

This invention relates to the handling of aggregate materials, and more particularly it concerns the conveying of a mixture of such materials so that the various mixture components do not become segregated.

The present invention is particularly useful in connection with concrete and other forms of masonry construction. In forming masonry products, it is necessary first to dry mix the various aggregate ingredients and thereafter to mix these ingredients with water to initiate the chemical reaction by which they are formed into the finished products.

Often it is necessary or desirable to convey the dry mixed concrete to a pouring station either before or during its mixture with water. Difficulties have been encountered in this connection, however; for the various ingredients would tend to segregate out, based on particle, size and weight, as the mixture was moved. Moreover, prior systems using conventional conveyors for moving the dry ingredients, additionally required special mixing devices for remixing the dry ingredients and for thereafter mixing them with water.

The present invention avoids all of these difficulties of the prior art. According to the present invention aggregate mixtures are conveyed without segregation of their various constituents. In fact, during conveyance according to the present invention, the various constituent particles are continually mixed. Moreover, in one aspect, the present invention involves the simultaneous mixing of masonry ingredients with water and the conveyance of these water mixed ingredients to a pouring station.

The advantages of the present invention are achieved by the placement of aggregate material inside a tubular conduit and by pushing forwardly against limited cross sectional areas of the material below its upper surface in the conduit. This forward pushing is achieved, according to the present invention by means of a drive element mounted and driven to move along a given path within the conduit. The drive element is specially shaped and arranged such that its driving surface extends over substantially less than the entire cross section of the conduit at every location therealong.

According to a preferred arrangement the drive element takes the form of a helical blade extending along inside the tubular conduit. The helical blade extends closely adjacent the interior walls of the conduit, but is open along its longitudinal axis. A drive axle extends along the axis of the conduit and is connected by means of spokes to the helical blade so that the blade will revolve within the conduit as the axle is rotated. As the blade rotates, it pushes longitudinally on the aggregate mixture closest to the interior walk of the conduit, while allowing the axially located portion of the mixture to fall in behind the blade. This produces a mixing effect which has been found to maintain and even enhance the evenness of particle distribution throughout the mixture.

In another aspect, the subject invention provides for the introduction of water into the conveying conduit, and this water takes part in the mixing operation so that there is produced without need for special mixing devices, a fully mixed ready to pour masonry composition.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein, In the drawings:

FIG. 1 is a side elevational view, partially cut away, showing a mortar handling system embodying the present invention;

FIG. 2 is an enlarged section view partially cut away, taken along lines 2—2 of FIG. 1;

FIG. 3 is a section view taken along lines 3—3 of FIG. 2;

FIG. 4 is a view taken along lines 4—4 of FIG. 3; and

FIG. 5 is a section view taken along lines 5—5 of FIG. 3.

The system of FIG. 1 is utilized for the on-site production of mortar mix for use in brick laying and the like. The technique of such on-site mortar production involves the premixing, at a remote location, of the dry aggregate material making up the mortar, conveying the dry mixed aggregate to the site, storing the aggregate material thereat, and subsequently mixing the aggregate material with water at the site to form the wet mortar mix.

As shown in FIG. 1 there is provided a storage bin 10 which is supported by means of a plurality of columns 12 above a hopper 14. The storage bin 10 is formed with a closed top 16 having a feed port 18 located centrally thereof. The feed port is normally closed by means of a cover 20. The cover 20 is periodically removed for loading the bin 10 through the feed port 18 with a dry aggregate mortar mix 22. As shown in FIG. 1, the mortar mix 22 fills the hopper 14 and the storage bin 10 immediately thereabove; and as the mix 22 is removed from beneath the hopper 14, additional mix will flow down into the hopper from the storage bin 10.

A vibrator 24 is mounted on a slanted surface 26 of the hopper 14 and serves to induce mechanical vibrations into the surface 26 to agitate the aggregate mix 22 located within the hopper to induce the material to flow down through an outlet opening 27 at the bottom of the hopper 14. The material then flows through a feed chute 28, past a feed gate 29 and through an inlet opening 30 at one end of an elongated tubular conveyor conduit 32. The conveyor conduit 32 extends in a horizontal direction out beyond the front columns 12. A conduit outlet chute 34 is formed at the front end of the conveyor conduit 32 and this outlet chute 34 is opened and closed by means of an outlet door 36.

The aggregate mix 22 is conveyed through the conveyor conduit 32 from its inlet opening 30 to its outlet opening 34 by means of a special auger conveyor element 38, described more fully hereinafter. The auger conveyor element 38 is rotatably driven by means of an axle shaft 40 which is supported in front and rear bearings 42 and 44 located respectively at the front and rear portions of the conveyor conduit 32. The axle shaft 40 is provided at one end with a pulley 46 which is driven from a drive belt 48 connected to a drive pulley 50 on an electrical drive motor 52. The drive motor 52 is mounted on a stand 54 which extends out from one of the support posts 12.

The internal construction of the conveyor conduit 32 and its various associated elements is shown most clearly in FIGS. 2–5. As there illustrated, the conveyor conduit 32 is essentially an elongated tubular structure having end walls 56 and 58 for supporting respectively the front and rear bearings 42 and 44 in which the axle shaft 40 is rotatably supported. The inlet opening 30 and the outlet chute 34 are located close to the end walls 56 and 58 of the conveyor conduit 32; and they open in directions generally transverse to the longitudinal axis of the conduit.

As shown in FIGS. 2 and 3, the feed gate 29 is an essentially flat slab-like structure which is guided for reciprocal movement within the inlet chute 28 by means of guide ways 60. The gate 29 extends out behind the inlet chute 28 and is there provided with an exposed handle 62 which may be grasped to adjust the position of the door so as to control the effective size of the inlet opening 30 and thereby control the rate of aggregate mix flow from the hopper 14 into the conveyor conduit 32.

Similarly, as shown in FIGS. 3 and 5, the outlet door 36 is also of slab-like configuration and is guided for reciprocal movement back and forth in the outlet chute 34 by means of guide ways 64. Additionally, the outlet door 36 extends out beyond the outlet chute and there provides with a handle 66 (FIG. 3) which may be grasped to control the position of the door 36 thereby controlling the amount of material which may proceed through the outlet opening 34.

The conveyor element 38 as shown in FIGS. 2 and 3 is a blade-like structure formed into a continuous helical configuration extending along inside the conveyor conduit 32. The conveyor element 38, as shown, has a major diameter just slightly less than the internal diameter of the conveyor conduit 32 so that it fits closely therein. The conveyor element 38, however, as shown in FIG. 4, has an axial opening 39 extending throughout its length. The axle shaft 40 extends through this opening, but is of substantially smaller diameter so that there remain open spaces 41 between the axle shaft 40 and the conveyor element 38. The conveyor element 38 is supported by means of spoke-like elements 42 displaced at various locations along the axle shaft 40 so that as the axle shaft 40 rotates, it will cause the helically shaped conveyor element 38 to rotate in place. It has been found that this configuration not only effectively causes movement of the aggregate mix from the inlet to the outlet openings of the conveyor conduit 32 but in addition it maintains the mix in a relatively uniform condition. It is believed that the hollow central portion of the conveyor element 38 produces a pushing action on the mix and at the same time causes tumbling, the combination of these two actions serving to maintain homogeneity during transfer of the mix.

In a particular structure which was found to work in an especially satisfactory manner, the conveyor conduit 32 had an internal diameter of approximately 12 inches while the axle shaft 40 had a diameter of approximately two inches. The width of the blade portion of the conveyor element 38 was two inches, thus leaving an eighth inch diameter cylindrical region along the conveyor conduit 32. A two inch diameter central portion of this region is of course occupied by the axle shaft 40.

As shown in FIGS. 4 and 5, the conveyor conduit 32 is formed with a flat top wall 70. Into this top wall 70 there are mounted a plurality of pipe fittings 72. These fittings 72 are connected via branch pipes 74 to a common water supply pipe 76. Water is supplied from a source (not shown) through the supply pipe 76, the branch pipes 74 and the fittings 72 to the interior of the conduit 32 near its inlet opening 30. As pointed out above, the action of the blade element 38, in addition to conveying agregate mix toward the right as viewed in FIGS. 2 and 3, also continuously homogenizes the mix by a combination tumbling and stirring action. Thus as water is poured into the conduit 32 at a proper rate this stirring will produce ready to use mortar, concrete etc. at the outlet chute 36.

In order to ensure that the mixed ready to use mortar or concrete is of a smooth consistency at the time of pouring, there are provided a plurality of beater elements 80 mounted on spoke like arms 82. These arms extend radially from the axle shaft 40 in the vicinity of the chute 34 so that as the axle shaft rotates, the beater elements 80 will mechanically work the material, thus preventing any tendency toward presetting from occurring.

It will be appreciated that with the above described arrangement, the materials making up the dry portion of a mortar or concrete composition may be premixed and stored on site for long periods of time, and then may be simultaneously mixed with water and conveyed in their mixed condition to a precise location for direct pouring into a form or other receptacle for immediate use.

Having thus described the invention with particular reference to the preferred form thereof, it will be obvious to those skilled in the art to which the invention pertains, after understanding the invention, that various changes and modifications may be made therein without departing from the spirit and scope of the invention, as defined by the claims appended theerto.

What is claimed as new and desired to be secured by Letters Patent is:

1. Apparatus for storing a dry mixture of masonry ingredients and for delivering a ready-to-pour masonry composition consisting of such mixture mixed with water, comprising a storage bin for containing the dry mixture of masonry ingredients and having a hopper at the bottom provided with a gated outlet for controlling the discharge of the dry mixture therefrom, an elongated conduit extending substantially horizontally from under said hopper and having an inlet opening adjacent one end communicating with said gated outlet to receive the dry mixture discharged therethrough and a discharge spout depending from said conduit adjacent the other end of the latter, a conveying and mixing member including a helical ribbon extending longitudinally in said conduit from said inlet opening to said discharge spout, said ribbon having its outer edge conforming closely to the inner surface of said conduit at the lower portion of the latter and having its inner edge spaced substantially radially outward from the longitudinal axis of the helical ribbon to define a longitudinal opening in the region of said axis, a rotated longitudinal drive shaft extending through said longitudinal opening and connected by spoke-like elements to said helical ribbon for turning the latter, beater elements extending radially from said shaft above said discharge spout, said conduit having at least part of its upper portion spaced substantially from said outer edge of the ribbon intermediate said inlet opening and said discharge spout, means for admitting water to said conduit at said part of its said upper portion for mixing with dry mixture being simultaneously mixed and propelled in the conduit toward said discharge spout by rotation of said helical ribbon with said drive shaft, and gate means at said discharge spout to selectively close and open the latter.

2. Apparatus according to claim 1, in which said lower portion of the conduit is semicylindrical and said conduit has vertical sides extending from said semicylindrical lower portion to a flat top wall which is substantially tangential to said outer edge of the helical ribbon, whereby said part of the upper portion spaced from the ribbon is disposed at opposite sides of a vertical plane through said longitudinal axis.

References Cited

UNITED STATES PATENTS

| | | | |
|---|---|---|---|
| 1,611,297 | 12/1926 | Wickey | 259—165 |
| 1,753,716 | 4/1930 | Owen | 259—161 |
| 2,608,395 | 8/1952 | August | 198—64 XR |
| 2,973,855 | 3/1961 | Pro | 198—64 XR |
| 3,212,624 | 10/1965 | Hess | 198—64 |

FOREIGN PATENTS

| | | |
|---|---|---|
| 80,886 | 12/1919 | Austria. |

ROBERT W. JENKINS, Primary Examiner

U.S. Cl. X.R.

198—213; 259—178